(12) United States Patent
Yano

(10) Patent No.: US 7,660,470 B2
(45) Date of Patent: Feb. 9, 2010

(54) SYSTEM AND METHOD FOR GENERATING SUPERIMPOSED IMAGE DATA

(75) Inventor: Takanori Yano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 881 days.

(21) Appl. No.: 10/966,020

(22) Filed: Oct. 14, 2004

(65) Prior Publication Data
US 2005/0084158 A1 Apr. 21, 2005

(30) Foreign Application Priority Data
Oct. 16, 2003 (JP) ............... 2003-356147

(51) Int. Cl.
G06K 9/36 (2006.01)
G06K 9/46 (2006.01)
(52) U.S. Cl. .................... 382/232; 382/284
(58) Field of Classification Search ............... 382/164, 382/166, 173, 190, 232, 233, 240, 244, 246, 382/251, 284, 305, 238; 345/4, 7, 9; 713/187; 375/228, 240.08, 240.11
See application file for complete search history.

(56) References Cited

U.S. PATENT DOCUMENTS

| 5,103,490 | A  | * | 4/1992  | McMillin ............... 382/284 |
| 5,999,219 | A  | * | 12/1999 | Boon ............... 375/240.12 |
| 6,167,158 | A  | * | 12/2000 | Boon ............... 382/238 |
| 6,353,681 | B1 | * | 3/2002  | Nagai et al. ............... 382/232 |
| 6,510,249 | B1 | * | 1/2003  | Boon ............... 382/238 |
| 6,560,364 | B2 | * | 5/2003  | Boon ............... 382/232 |
| 6,647,202 | B1 |   | 11/2003 | Yamaguchi et al. |
| 6,850,648 | B2 | * | 2/2005  | Suzuki ............... 382/233 |
| 7,120,297 | B2 | * | 10/2006 | Simard et al. ............... 382/166 |
| 7,167,988 | B2 | * | 1/2007  | Hayashi ............... 713/187 |
| 2001/0016077 | A1 | * | 8/2001 | Oki ............... 382/240 |
| 2001/0024468 | A1 | * | 9/2001 | Miyashita et al. ............... 375/228 |
| 2003/0016746 | A1 | * | 1/2003 | Ito et al. ............... 375/240.08 |
| 2003/0165271 | A1 | * | 9/2003 | Boon ............... 382/238 |
| 2003/0165273 | A1 |   | 9/2003 | Berkner et al. |
| 2004/0086043 | A1 | * | 5/2004 | Ito et al. ............... 375/240.11 |
| 2005/0084158 | A1 | * | 4/2005 | Yano ............... 382/232 |

FOREIGN PATENT DOCUMENTS

| JP | 09-162829 | 6/1997 |
| JP | 10-271450 | 10/1998 |

(Continued)

OTHER PUBLICATIONS

Japanese Office Action, Patent Application No. JP 2003-356147, Issue Date Dec. 12, 2007 (2 pages).

Primary Examiner—Amir Alavi
(74) Attorney, Agent, or Firm—Blakely, Sokoloff, Taylor & Zafman LLP

(57) ABSTRACT

An image processing system is disclosed that includes a superimposing merger operation unit. The superimposing merger operation unit receives the encoded data of a main image and the encoded data of a sub image, and generates superimposedly merged encoded data by merging the encoded data of the main and sub images superimposedly. The superimposedly merged encoded data generated by the superimposing merger operation unit is configured so that the main image is stored therein and that when the superimposedly merged encoded data is decoded, each of the main image and sub image is reproduced with the sub image being reproduced superimposedly with respect to the main image.

24 Claims, 16 Drawing Sheets

FOREIGN PATENT DOCUMENTS

| | | |
|---|---|---|
| JP | 2000-236509 | 8/2000 |
| JP | 2001-008039 | 1/2001 |
| JP | 2002-209186 | 7/2002 |
| JP | 2003-022610 | 1/2003 |
| JP | 2003-078767 | 3/2003 |

* cited by examiner

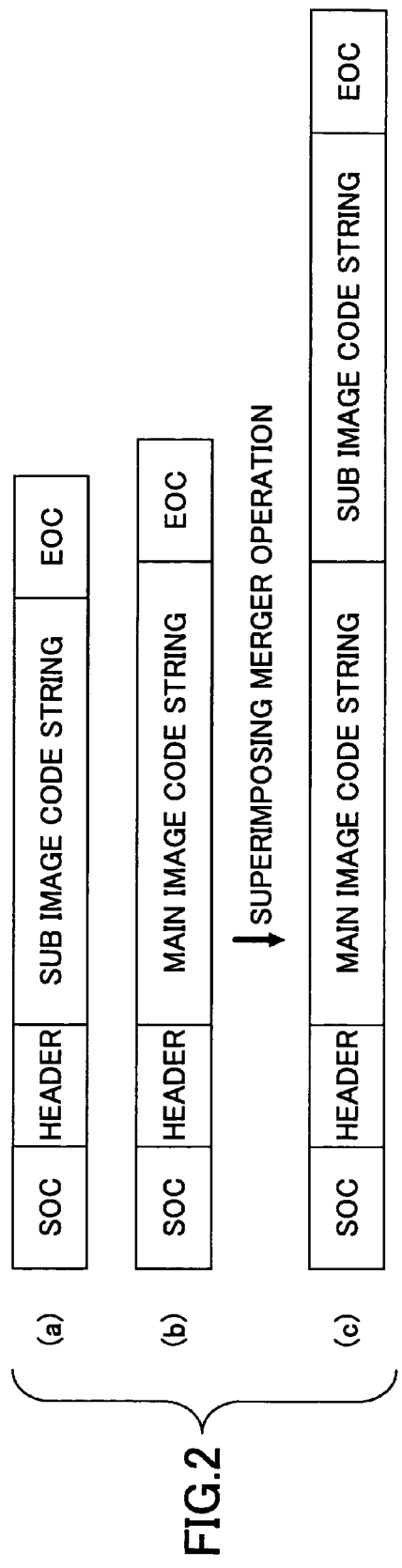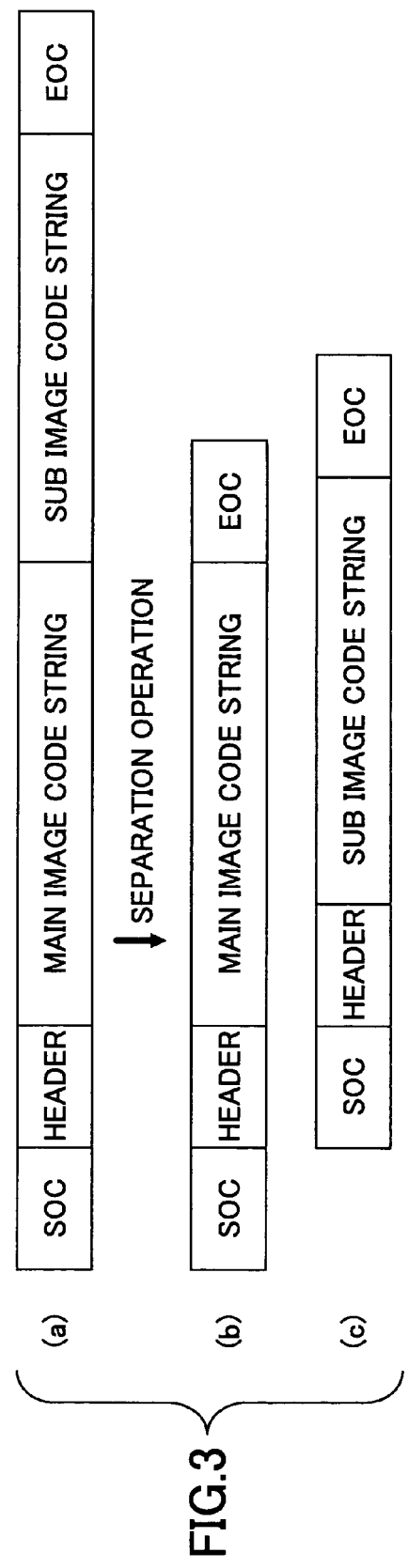

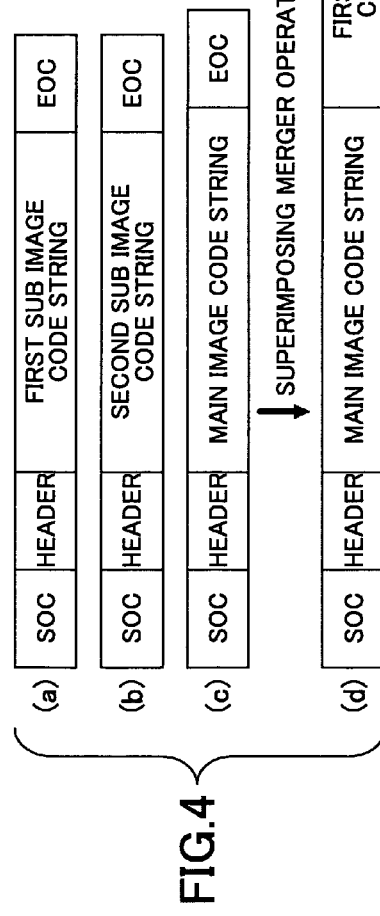
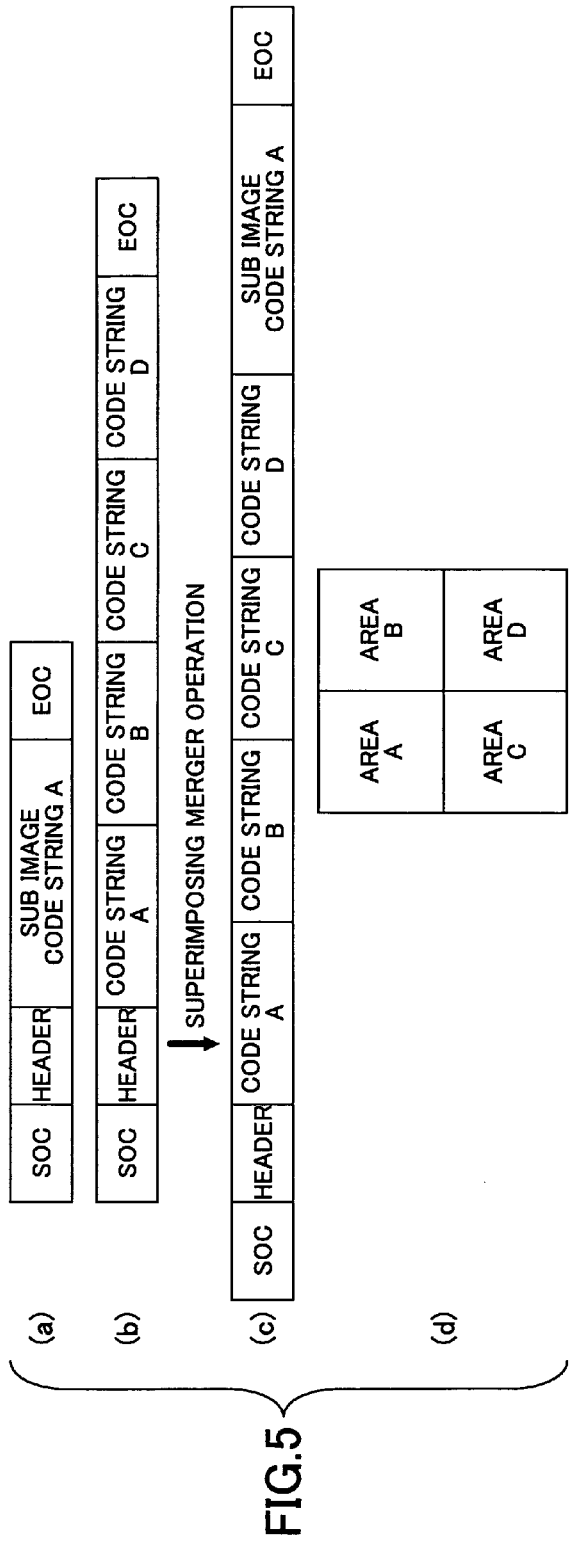
FIG.4
FIG.5

SYSTEM AND METHOD FOR GENERATING SUPERIMPOSED IMAGE DATA

The present application claims priority to the corresponding Japanese Application No. 2003-356147, filed Oct. 16, 2003, the entire contents of which are hereby incorporated by reference.

BACKGROUND OF THE INVENTION

1. Field of the Invention

The present invention relates generally to image processing, and more particularly to code-level image processing.

2. Description of the Related Art

In the case of displaying an image, it may be desired to add a name, date, legend, or logo to the image or to mask a particular portion of the image.

As methods of obtaining the encoded data of such an image to which information is added or on which masking is performed, a method that performs encoding after replacing a partial area of an original image with another image (image-level area replacement) and a method that divides an original image into multiple areas, performs encoding area by area, and replaces the encoded data of part of the areas with the encoded data of another image (code-level area replacement) are well known. Japanese Laid-Open Patent Application Nos. 2001-008039 and 2003-078767 are examples of well known literature related to the latter method.

In the encoded data obtained by the above-described image-level or code-level area replacement, information on the area of the original image to be replaced is not stored. Accordingly, the original image before editing cannot be reproduced. For instance, it is not possible to remove a mask and see the original image. Nor is it possible to reproduce the original image without an added legend.

According to the method that performs image-level area replacement, both the original image and an area image to replace a partial image thereof require image data (pixel value data). If each image is prepared in encoded data, first, the encoded data is decoded, then, replacement is performed, and thereafter, re-encoding is required, thus resulting in a great processing load. In the case of irreversible encoded data, image quality is degraded in the decoding and re-encoding processes.

According to the method that performs code-level area replacement, a replacing area image and the area to be replaced of the original image should be in agreement with each other in size, shape, and position. If there is no agreement in size, shape, or position, there are problems in that an image reproduced from encoded data includes distortion and that there is an increase in the overall size. In other words, the replacing area image is limited in size, shape, and position.

SUMMARY OF THE INVENTION

A method and image processing system are described. In one embodiment, the image processing system comprises a superimposing merger operation unit to receive encoded data of a main image and encoded data of at least one sub image and generate merged encoded data via superimposition by merging the encoded data of the main and sub images superimposedly, wherein the merged encoded data generated by the superimposing merger operation unit is such that the main image is stored therein and that when the merged encoded data is decoded, each of the main image and sub image is reproduced with the sub image being reproduced such that the sub image is superimposed with respect to the main image.

BRIEF DESCRIPTION OF THE DRAWINGS

Other embodiments, features and advantages of the present invention will become more apparent from the following detailed description when read in conjunction with the accompanying drawings, in which:

FIG. 2 is a diagram for illustrating a superimposing merger operation according to a first embodiment of the present invention;

FIG. 3 is a diagram for illustrating a separation operation according to the first embodiment of the present invention;

FIG. 4 is another diagram for illustrating the superimposing merger operation according to the first embodiment of the present invention;

FIG. 5 is yet another diagram for illustrating the superimposing merger operation according to the first embodiment of the present invention;

DETAILED DESCRIPTION OF THE PREFERRED EMBODIMENTS

Figure 1:
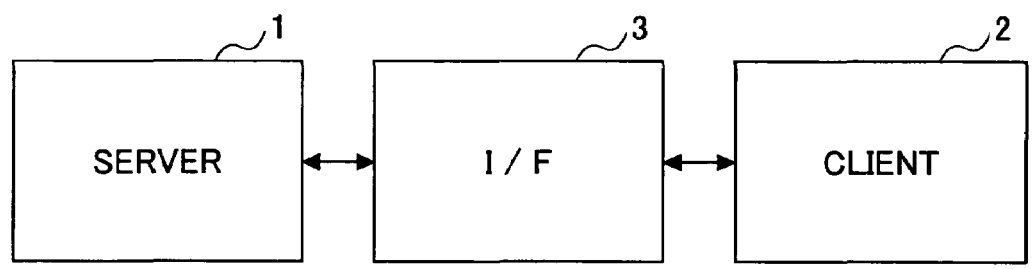
FIG. 1 is a block diagram for illustrating an image processing system having a client/server architecture according to the present invention.

Accordingly, embodiments of the present invention include an image processing system and method in which the above-described disadvantages are eliminated.

More specific embodiments of the present invention include an image processing system and method that can display an original (main) image with a name, date, legend, or logo being added thereto or a particular portion thereof being masked.

Embodiments of the present invention are achieved by an image processing system including a superimposing merger operation unit to receive encoded data of a main image and encoded data of at least one sub image and generate merged encoded data by merging the encoded data of the main and sub images via superimposition, wherein the merged encoded data generated by the superimposing merger operation unit so that the main image is stored therein and that when the merged encoded data is decoded, each of the main image and sub image is reproduced with the sub image being reproduced such that the sub image is superimposed with respect to the main image.

Embodiments of the present invention also include an image processing method that includes generating merged encoded data by merging encoded data of a main image and encoded data of at least one sub image via superimposition, wherein the generated merged encoded data is such that the main image is stored therein and that when the merged encoded data is decoded, each of the main image and sub image is reproduced with the sub image being reproduced such that the sub image is superimposed with respect to the main image.

Embodiments of the present invention also include a computer-readable recording medium on which a program for causing a computer to execute an image processing method is recorded, the image processing method including generating merged encoded data by merging encoded data of a main image and encoded data of at least one sub image via superimposition, wherein the generated merged encoded data is such that the main image is stored therein and that when the merged encoded data is decoded, each of the main image and sub image is reproduced with the sub image being reproduced such that the sub image is superimposed with respect to the main image.

According to the present invention, by decoding encoded data into which the encoded data of a main image and the encoded data of a sub image are merged, the main image can be displayed with a name, date, legend, or logo being added thereto or a particular portion thereof being masked. Unlike in area replacement, the complete main image is stored in the merged encoded data. Accordingly, it is possible to display only the main image, and it is also possible to display only the sub image. Since the sub image is merged into the main image and does not replace a partial area of the main image, the sub image may have any size and shape, so that the merger (or reproduction) position of the sub image can be set to any position as desired.

A description is given, with reference to the accompanying drawings, of embodiments of the present invention.

An image processing system according to the present invention may have a client/server architecture as shown in FIG. 1. Referring to FIG. 1, the client/server architecture includes a server 1, a client 2, and a client-server interface (I/F) 3. Typically, a code-level superimposing merger operation as described below is performed on encoded data in the server 1. Then, encoded data generated after the superimposing merger operation is transferred to the client 2 via the client-server interface 3. The encoded data is decoded and a reproduced image is displayed by the client 2. Further, an instruction on generation of the encoded data after the superimposing merger operation is entered using the user interface of the client 2, and the contents of the instruction are transferred to the server 1. As described below, the client 2 may include a processing unit for adding code-level editing to the encoded data generated after the superimposing merger operation.

This image processing system can be realized by a program on one or more computers. For instance, the server 1 and the client 2 may be realized by a program on a single computer, and the client-server interface 3 may exchange information between the server 1 and the client 2 via a system bus or a memory inside the computer. Alternatively, the server 1 and the client 2 may be realized by respective programs that operate on different computers, and the client-server interface 3 may exchange information between the server 1 and the client 2 via a connection cable or network between the computers.

A description is given below in more detail of embodiments of the present invention with respect to the image processing system having a client/server architecture as shown in FIG. 1. The image processing system according to the present invention is not limited to a client/server architecture, and may be realized either as a single apparatus or as a group of multiple apparatuses connected to a network.

Figure 6:
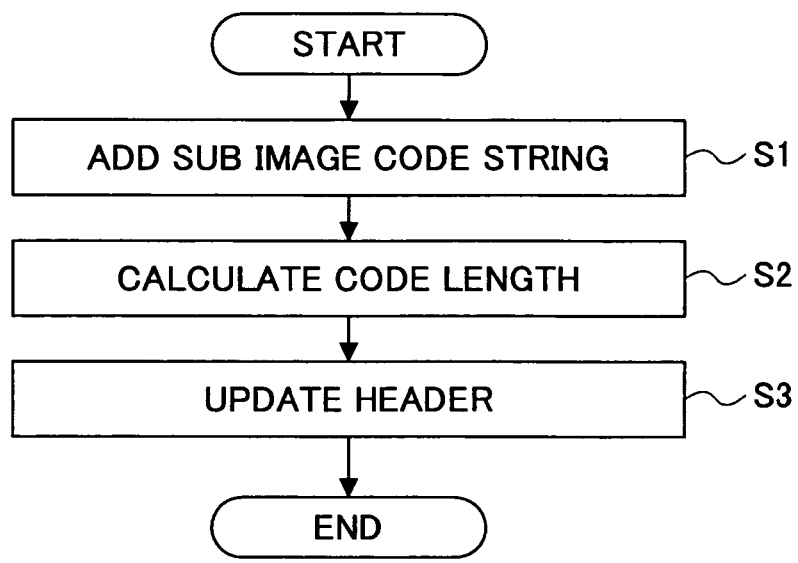
FIG. 6 is a flowchart for illustrating the superimposing merger operation according to the first embodiment of the present invention.
Figure 7:
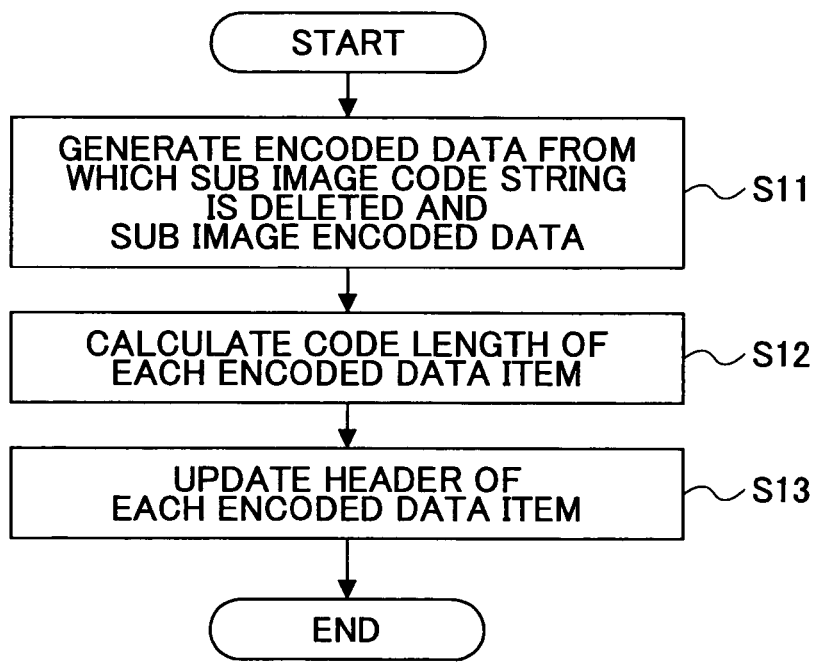
FIG. 7 is a flowchart for illustrating the separation operation according to the first embodiment of the present invention.

A description is given, with reference to FIGS. 2 through 16, of a first embodiment of the present invention. FIGS. 2 through 5 are diagrams for illustrating the superimposing merger operation or a separation operation. FIGS. 6 and 7 are flowcharts for illustrating the superimposing merger operation and the separation operation, respectively. FIGS. 8A through 10 are diagrams for illustrating applications of the superimposing merger operation. FIGS. 11 through 15 are block diagrams for illustrating functional configurations of the image processing system according to elements of the present invention.

First, a description is given, with reference to FIGS. 2 through 5, of the superimposing merger operation and its reverse operation, the separation operation.

FIG. 2 is a diagram for illustrating a case of the superimposing merger operation. According to this embodiment, the encoded data of a sub (secondary) image is merged into the encoded data of a main (primary) image in a superimposed manner, or "superimposedly." In FIG. 2, (a) is a schematic diagram of the encoded data (codestream) of the sub image (for instance, the text image of a date and time or name), (b) is a schematic diagram of the encoded data of the main image, and (c) is a schematic diagram of encoded data obtained after the superimposing merger operation, where the code string of the encoded data of the sub image is added to the end of a code string in the encoded data of the main image. Normally, the code length of a code string is written in the header of encoded data. In this case, since the code length of the code string is increased by the superimposing merger operation, the code length in the header is rewritten.

Here, the superimposing merger operation refers to a code-level merger operation in which:

the main image is stored in the encoded data after the operation; and in the case of decoding the encoded data after the operation, both main and sub images are reproduced, and the sub image is reproduced superimposedly with respect to the main image.

That the sub image is reproduced superimposedly with respect to the main image is that the sub image is reproduced, being superimposed on and within the main image. The sub image is easily displayable in either manner: being superimposed on (top of) the main image or being superimposed on the bottom of the main image (put under the main image). Thus, the superimposing merger operation of an embodiment the present invention, according to which both main and sub images are reproducible, is different from both the operation of replacing the code string of a particular portion of the main image with the code string of the sub image and the operation of performing encoding after replacing a particular portion of the main image with the sub image. It is possible to set position-specifying-data for specifying a desired position of reproduction (merger) of the sub image in encoded data (for instance, in its header) obtained (generated) after the superimposing merger operation. Hereinafter, the encoded data obtained after the superimposing merger operation may be referred to as "superimposedly merged encoded data."

FIG. 6 is a flowchart showing the outline of the flow of this superimposing merger operation. First, in step S1 of FIG. 6, the code string in the encoded data of the sub image is added to the code string in the encoded data of the main image in view of the reproduction (or merger) position of the sub image at which the sub image is to be reproduced (or merged). Then, in step S2, a code length is calculated, and in step S3, the header is updated with the calculated code length. The superimposing merger operation can be performed in this procedure.

FIG. 3 is a diagram for illustrating a case of the separation operation of the superimposedly merged encoded data. In FIG. 3, (a) is a schematic diagram of the superimposedly merged encoded data (corresponding to (c) of FIG. 2). By the separation operation, the code string of the sub image is deleted from the superimposedly merged encoded data, so that the encoded data of the main image as shown in (b) of FIG. 3 and the encoded data of the sub image as shown in (c) of FIG. 3, where information such as a header is added to the code string of the sub image, are generated. The code length in each of the headers of the encoded data after the separation operation is updated.

According to the superimposing merger operation of the present invention, the code strings of both main and sub images are stored complete. Accordingly, such a separation operation is performable. Further, referring to FIG. 12, in encoded data of (d) in which the encoded data of multiple sub images of (a) and (b) are merged superimposedly into the encoded data of the main image of (c), the encoded data of the main image and the encoded data of each sub image can be separated, and the superimposedly merged encoded data of the main image and one (or more if there are more than two sub images) of the sub images can be generated. Such operations are performable only with encoded data subjected to the superimposing merger operation of one embodiment of the present invention. It is impossible to perform such operations with encoded data subjected to code-level or image-level replacement.

FIG. 7 is a flowchart showing the outline of this separation operation. First, in step S11 of FIG. 7, the encoded data of the main image is generated by deleting the code string of the sub image from the superimposedly merged encoded data, and the encoded data of the sub image is generated from the deleted code string of the sub image. Then, in step S12, the code length of the encoded data of each of the main and sub images is calculated, and in step S13, the headers of the encoded data are updated with the corresponding code lengths. The separation operation can be performed in this procedure.

In the case of FIG. 2, the encoded data of the single sub image is merged superimposedly into the encoded data of the main image. Alternatively, it is also possible to merge the encoded data of multiple sub images superimposedly into the encoded data of the main image as described above with reference to FIG. 4. Referring to FIG. 4, (a) and (b) shows the encoded data of a first sub image and the encoded data of a second sub image, respectively, and (c) shows the encoded data of the main image. Encoded data into which the above-described encoded data are superimposedly merged is shown schematically in (d) of FIG. 4.

By subjecting the encoded data of (d) of FIG. 4 to the separation operation, the encoded data of the main image and the encoded data of each sub image can be generated. Further, it is also possible to generate encoded data into which the encoded data of the main image and the encoded data of one of the sub images are merged (in this case, two superimposedly merged encoded data items). All of these encoded data (encoded data items) need not necessarily be generated. It is also possible to selectively generate a necessary one or more of these encoded data items.

FIG. 5 is a diagram for illustrating another case of the superimposing merger operation. In this case, the main image is divided into four areas A, B, C, and D as shown in (d) of FIG. 5, and encoding is performed area by area. In FIG. 5, (b) is a schematic diagram of the encoded data of the main image, whose code string is divided into code strings A, B, C, and D corresponding to the four divided areas A, B, C, and D, and (a) is a schematic diagram of the encoded data of the sub image corresponding to the divided area A. Using the superimposing merger operation, the code string of the encoded data of the sub image is added to the end of the code string in the encoded data of the main image, so that encoded data as shown schematically in (c) of FIG. 5 is generated. When the encoded data of (c) of FIG. 5 is decoded, both main and sub images are reproduced with the sub image being reproduced superimposedly in the divided area A of the main image. The encoded data may be displayed so that the main image is visible. Alternatively, or in addition, the encoded data may be displayed so that the sub image is visible.

Figure 8A:
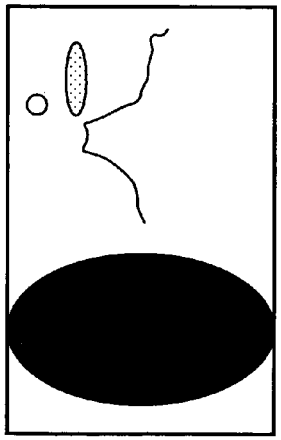
FIGS. 8A through 8C are diagrams for illustrating applications of the superimposing merger operation according to the first embodiment of the present invention.
Figure 8B:
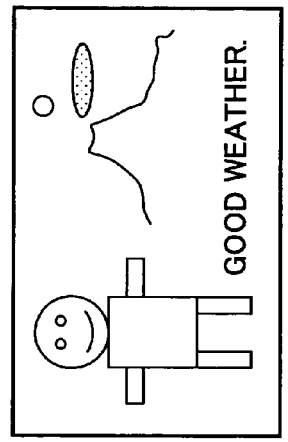
Figure 8C:
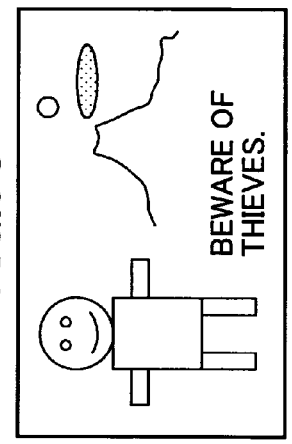

FIGS. 8A through 10 are diagrams showing applications of the above-described superimposing merger operation. FIG. 8A shows a case where a sub image showing a date and time is merged into the main image so as to be superimposed thereon, that is, is merged superimposedly into the main image. FIG. 8B shows a case where a sub image showing the name of a person who is the subject of the main image is merged superimposedly into the main image. FIG. 8C shows a case where a sub image showing an arrow is merged superimposedly into the main image. In the case of FIG. 8A, if it is possible to generate the encoded data of a sub image representing real time, real time can be displayed superimposedly on the main image.

Figure 9A:
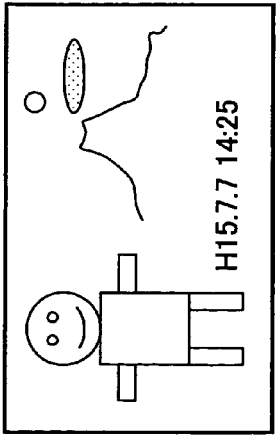
FIGS. 9A through 9C are diagrams for illustrating other applications of the superimposing merger operation according to the first embodiment of the present invention.
Figure 9B:
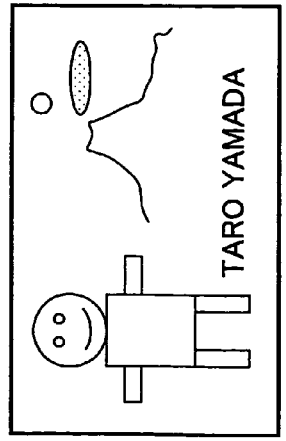
Figure 9C:
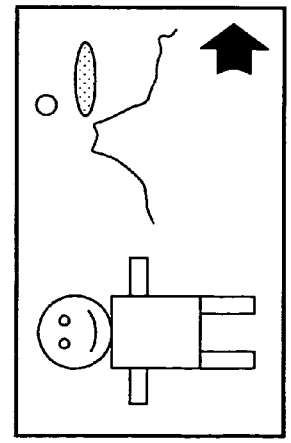

FIG. 9A shows a case where a sub image for masking a portion of the main image is merged superimposedly into the main image. FIG. 9B shows a case where a sub image showing the legend (caption) of the main image is merged superimposedly into the main image. FIG. 9C shows a case where a sub image showing emergency information is merged superimposedly into the main image.

Figure 10:
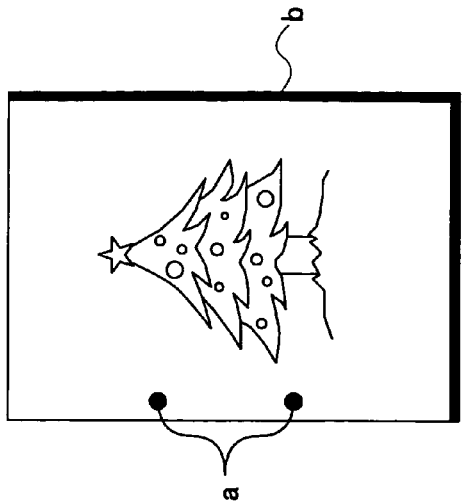
FIG. 10 is a diagram for illustrating yet another application of the superimposing merger operation according to the first embodiment of the present invention.

Noises such as punch hole shadows a and an original edge shadow b as shown in FIG. 10 are likely to be generated in an image obtained by reading a paper original by a scanner. By performing the superimposing merger operation with such an image being a main image and an image for masking the noises (a white image) being a sub image, the noises can be covered with the sub image.

Figure 11:
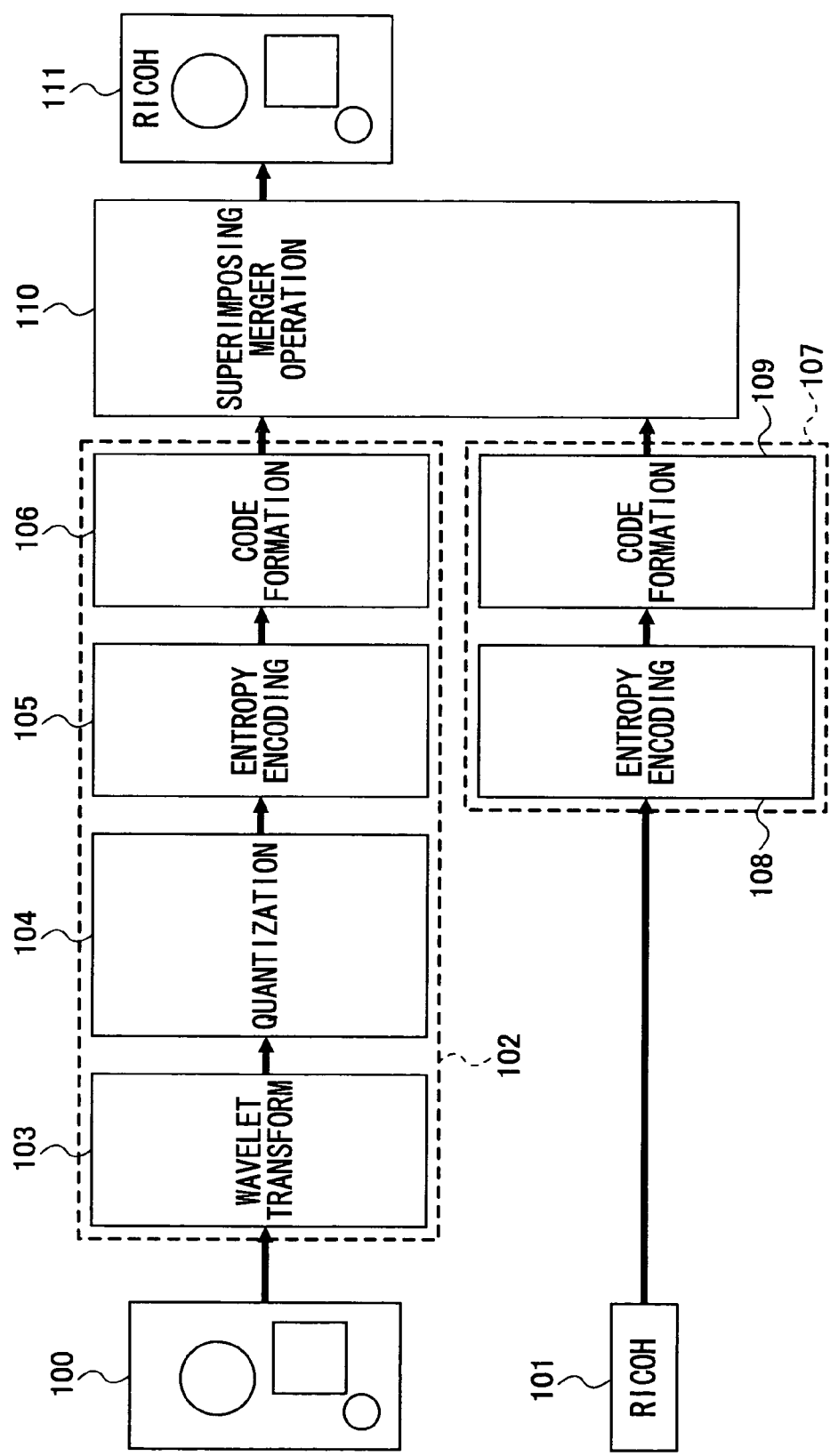
FIG. 11 is a block diagram for illustrating a functional configuration of the image processing system according to the first embodiment of the present invention.

FIG. 11 is a block diagram for illustrating a functional configuration for generating the encoded data of each of a main image 100 and a sub image 101 and generating encoded data 111 into which the encoded data of the main and sub images 100 and 101 are merged superimposedly.

Referring to FIG. 11, the main image 100 is input to a first encoding unit 102, so that the first encoding unit 102 generates the encoded data of the main image 100. Further, the sub image 101 is input to a second encoding unit 107, so that the second encoding unit 107 generates the encoded data of the sub image 101. A superimposing merger operation unit 110 performs the superimposing merger operation on the encoded data of the main image 100 and the encoded data of the sub image 101, thereby generating the (superimposedly merged) encoded data 111. The first encoding unit 102, the second encoding unit 107, and the superimposing merger operation unit 110 are included in the server 1 (FIG. 1) of the image processing system according to one embodiment of the present invention.

Basically, each of the first and second encoding units 102 and 107 may perform any encoding algorithm. In this case, the first encoding unit 102 complies with the JPEG2000 encoding algorithm, and includes a wavelet transform unit 103, a quantization unit 104, an entropy encoding unit 105, and a code formation unit 106. A description is given below of JPEG2000. Meanwhile, a binary image such as a text image is assumed as the sub image 101. The second encoding unit 107 has a simple structure, including an entropy encoding unit 108 and a code formation unit 109.

By thus using different encoding algorithms suitable for the main image 100 and the sub image 101, respectively, considering their difference in type or nature, effective encoding can be performed. According to this configuration, the encoded data of the main image 100 and the encoded data of the sub image 101 are different in structure. However, this is not a particular obstacle to the superimposing merger operation. Alternatively, the first and second encoding units 102 and 107 may have the same configuration. Further, a common encoding unit may be used to encode the main and sub images 100 and 101.

Figure 15:
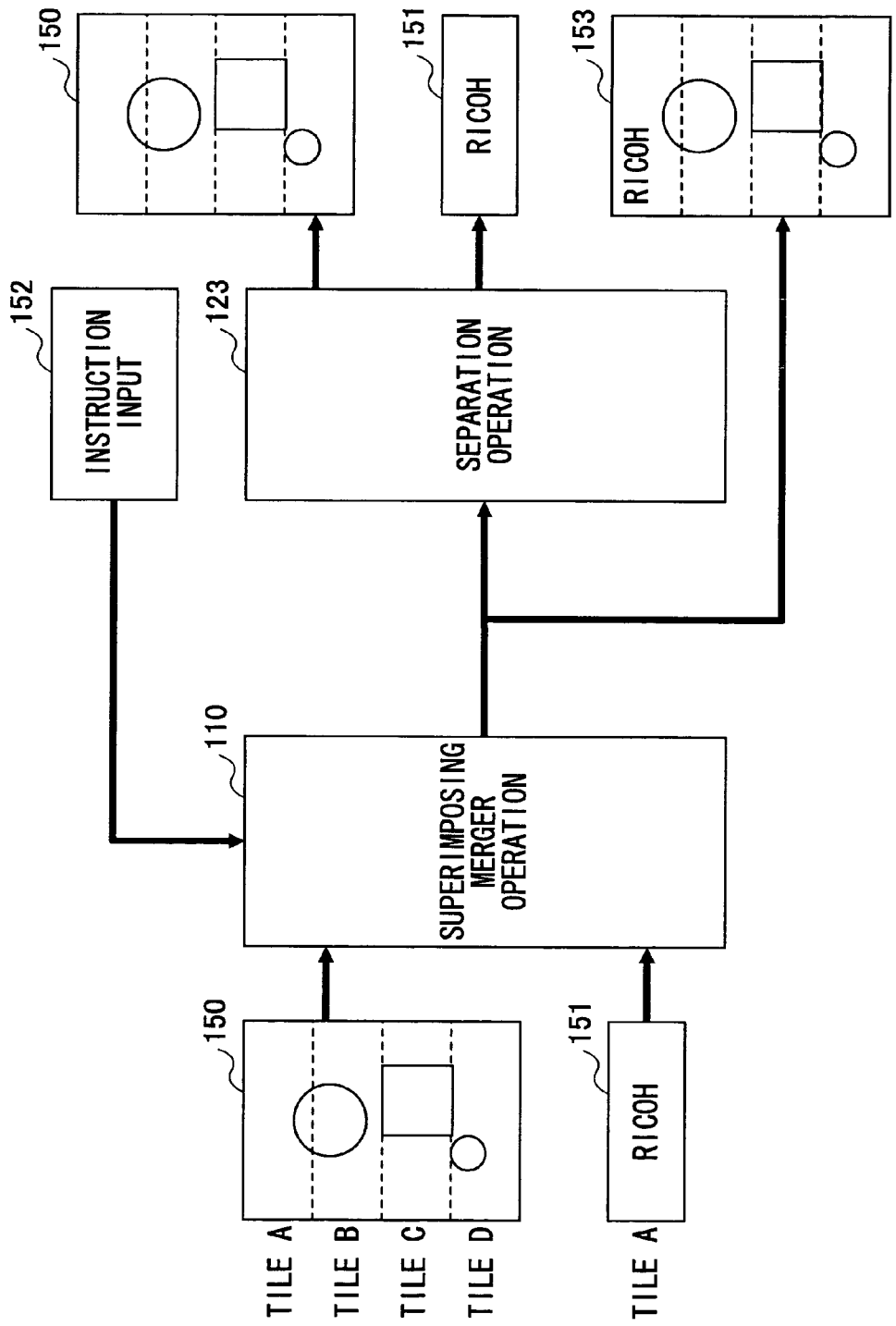
FIG. 15 is a block diagram for illustrating still another functional configuration of the image processing system according to the first embodiment of the present invention.
Figure 16:
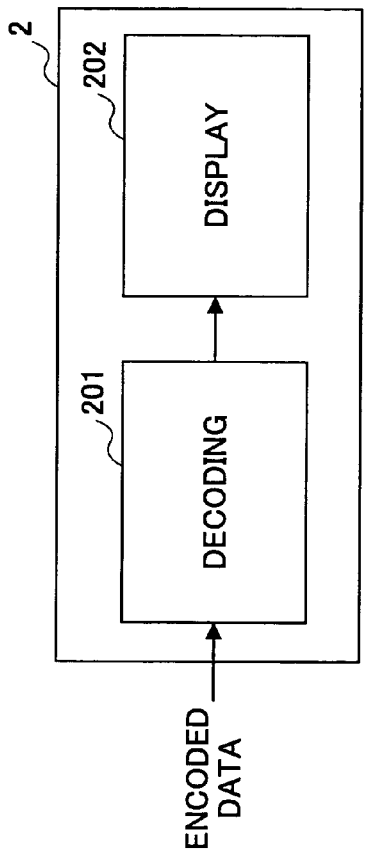
FIG. 16 is a block diagram for illustrating a functional configuration of a client according to the first embodiment of the present invention.

The superimposedly merged encoded data 111 generated in the server 1 (FIG. 1) is transferred to the client 2 via the client-server interface 3. As shown in FIG. 16, the client 2 includes a decoding unit 201 that decodes encoded data and a display unit 202 that displays an image obtained by decoding the encoded data in the decoding unit. This is also the case with FIGS. 12 through 15. As described above, the superimposedly merged encoded data 111 is decoded so that both main and sub images 100 and 101 are reproduced and so that the sub image 101 is reproduced superimposedly with respect to the main image 100. Further, as described above, it is possible to display the sub image 101 on the main image 100, and it is also possible to display the sub image 101 under the main image 100.

Figure 12:
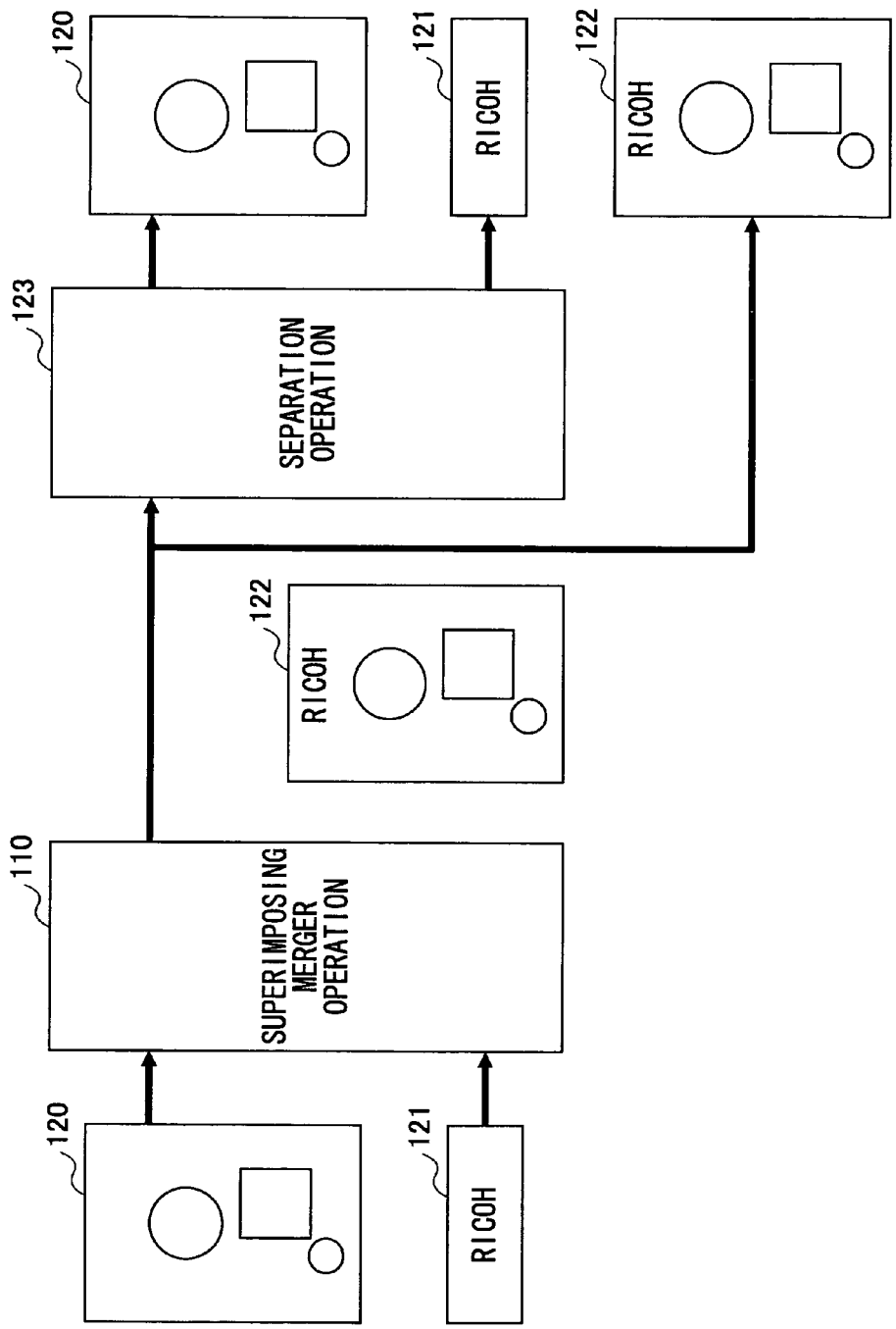
FIG. 12 is a block diagram for illustrating another functional configuration of the image processing system according to the first embodiment of the present invention.

As shown in FIG. 12, the client 2 of the image processing system may include a separation operation unit 123 for the above-described separation operation. In the server 1, main image encoded data 120 and sub image encoded data 121 are input to the superimposing merger operation unit 110, and obtained superimposedly merged encoded data 122 is transferred to the client 2 via the client-server interface 3. In the client 2, the superimposedly merged encoded data 122 may be directly decoded and reproduced. Alternatively, it is also possible to separate the encoded data 122 into the main image encoded data 120 and the sub image encoded data 121, selectively decode the encoded data 120 or 121 as desired, and display the image of the selectively decoded encoded data 120 or 121, based on an instruction from a user through the user interface of the client 2.

Figure 13:
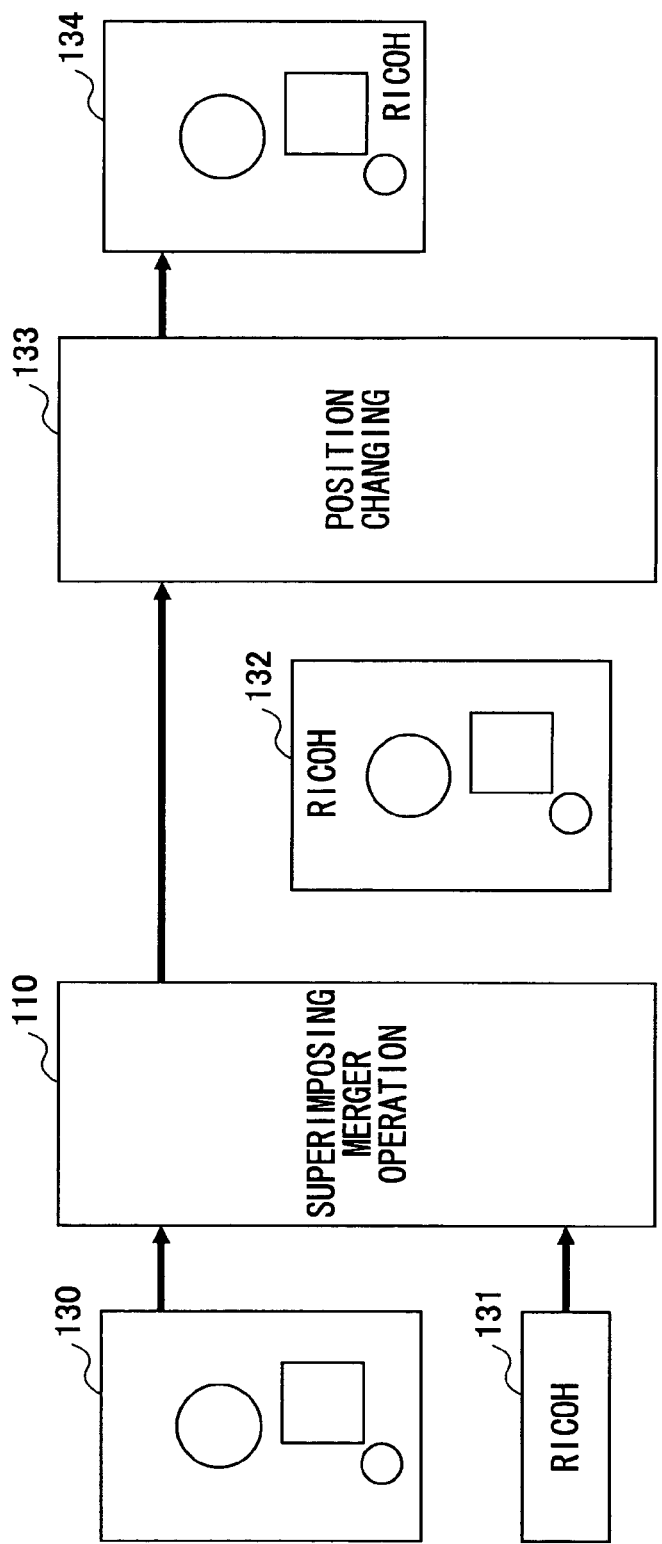
FIG. 13 is a block diagram for illustrating yet another functional configuration of the image processing system according to the first embodiment of the present invention.

As shown in FIG. 13, the client 2 of the image processing system may include a position changing unit 133 for changing the reproduction (or merger) position of a sub image. In the server 1, main image encoded data 130 and sub image encoded data 131 are input to the superimposing merger operation unit 110, and obtained superimposedly merged encoded data 132 is transferred to the client 2 via the client-server interface 3. In the client 2, the received encoded data 132 may be directly decoded. Alternatively, by giving an instruction through the user interface of the client 2, the position specifying information (data) of the sub image within the encoded data 132 may be updated in the position changing unit 133, so that encoded data 134 in which the reproduction (or merger) position of the sub image has been changed may be generated, decoded, and displayed.

Figure 14:
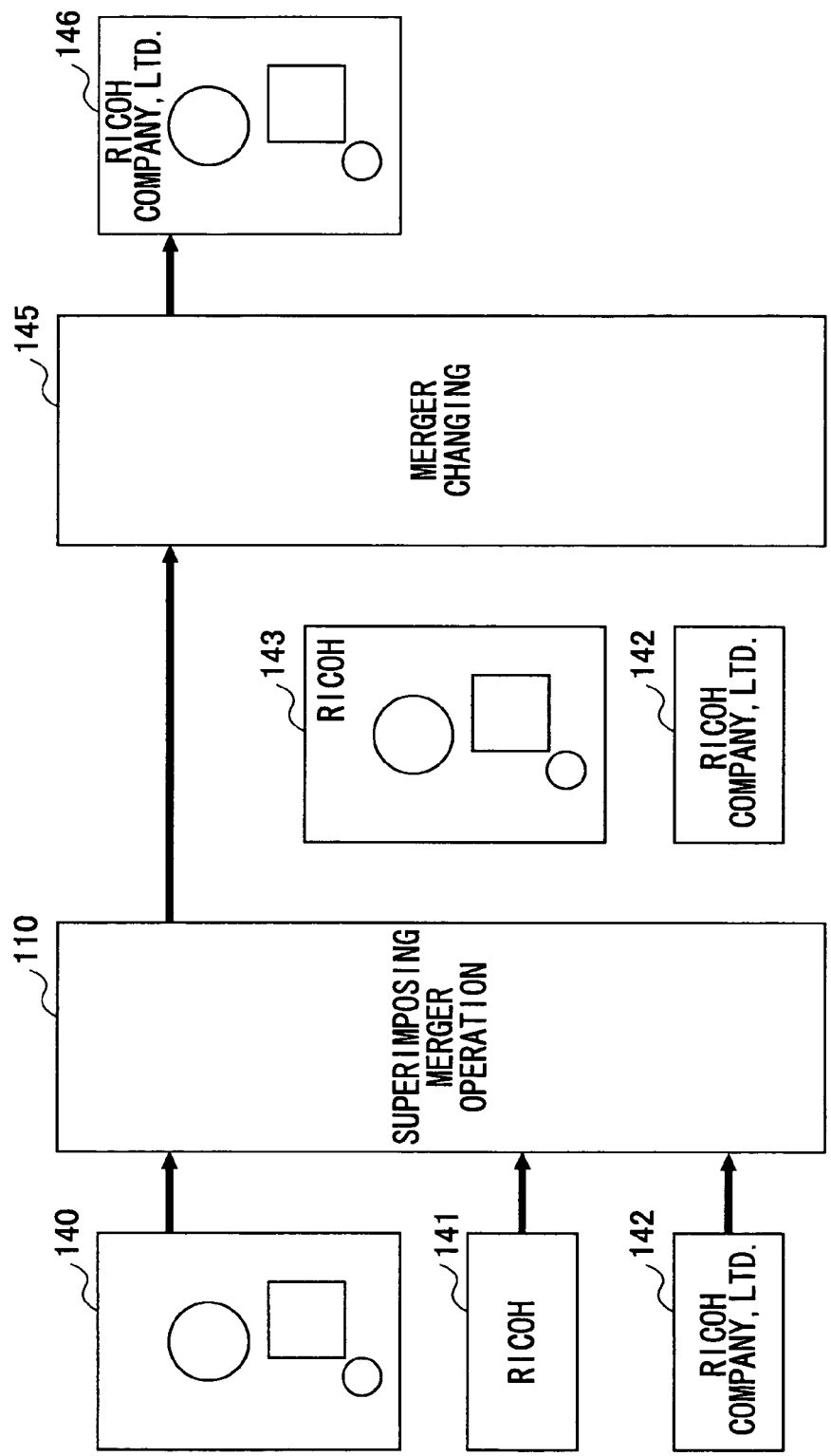
FIG. 14 is a block diagram for illustrating still another functional configuration of the image processing system according to the first embodiment of the present invention.

As shown in FIG. 14, the client 2 may include a merger changing unit 145. In the server 1, encoded data 143 is generated by performing the superimposing merger operation on main image encoded data 140 and sub image encoded data 141, and the (superimposedly merged encoded data 143) is transferred to the client 2. In the client 2, an instruction may be given through the user interface so as to have other sub image encoded data 142 transferred thereto. Then, after deleting the code string of the sub image encoded data 141 from the encoded data 143, the merger changing unit 145 may generate encoded data 146 by merging the other sub image encoded data 142 superimposedly into the main image encoded data 140. At this point, operations such as the updating of a code length are performed as desired.

A user can specify a main image and a sub image to be subjected to the superimposing merger operation and the merger (or reproduction) position of the sub image through the user interface of the client 2. FIG. 15 shows such a case. With an instruction input unit 152 included in the user interface of the client 2, a user can specify to the superimposing merger operation unit 110 of the server 1 a main image and a sub image to be subjected to the superimposing merger operation and the merger (or reproduction) position of the sub image. Further, the user can also specify operation contents to the separation operation unit 123 of the client 2. Encoded data 153 obtained by performing the superimposed merger operation on specified main image encoded data 150 and specified sub image encoded data 151 is transferred to the client 2. As described above, if the separation operation unit 123 is requested to perform the separation operation by the user, the separation operation unit 123 performs the separation operation on the superimposedly merged encoded data 153, decoding the main image encoded data 150 or the sub image encoded data 151 in the decoding unit 201 (FIG. 16) and displaying the image of the decoded main or sub image encoded data 150 or 151 in the display unit 202 (FIG. 16) in accordance with the instruction from the user. If there is no instruction from the user to perform the separation operation, the superimposedly merged encoded data 153 is decoded by the decoding unit 201, and the image thereof is displayed by the displaying unit 202.

The main image encoded data 150 may be divided into multiple areas A, B, C, and D (for instance, JPEG2000 tile areas) as shown in FIG. 15. In this case, the sub image can be merged superimposedly into a particular area of the main image as described with reference to FIG. 5.

Figure 17:
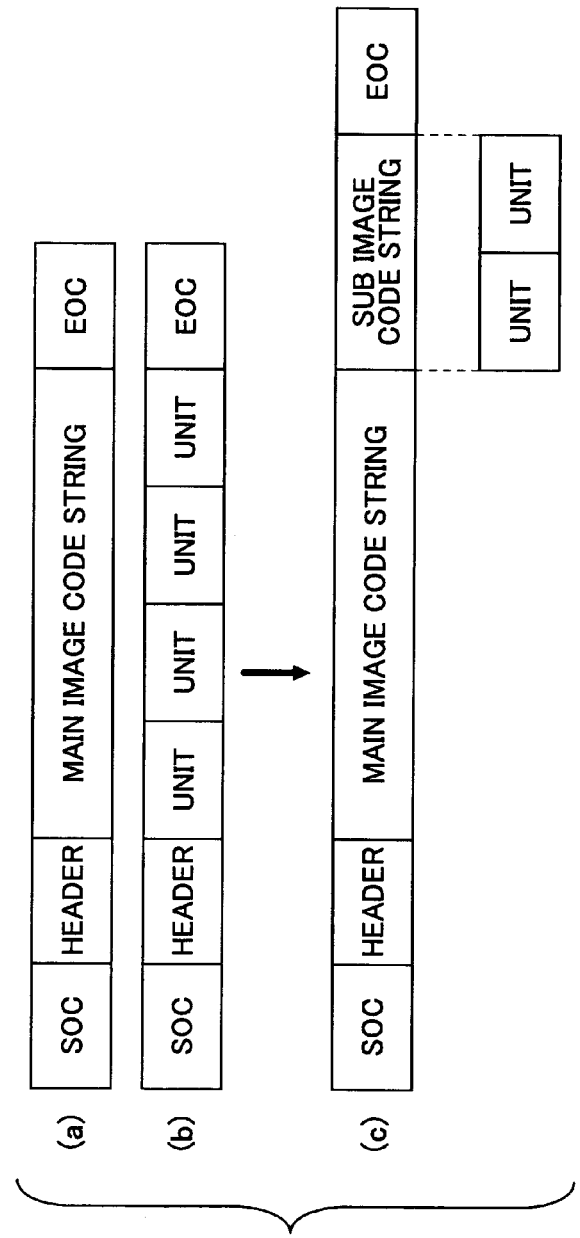
FIG. 17 is a diagram for illustrating the superimposing merger operation according to a second embodiment of the present invention.
Figure 18:
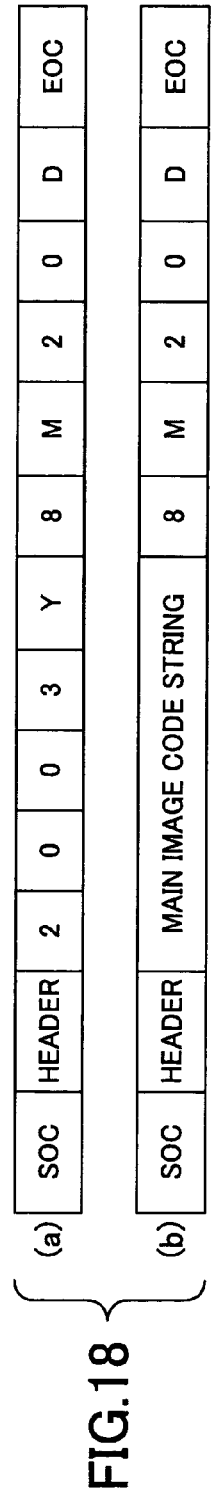
FIG. 18 is another diagram for illustrating the superimposing merger operation according to the second embodiment of the present invention.
Figure 19:
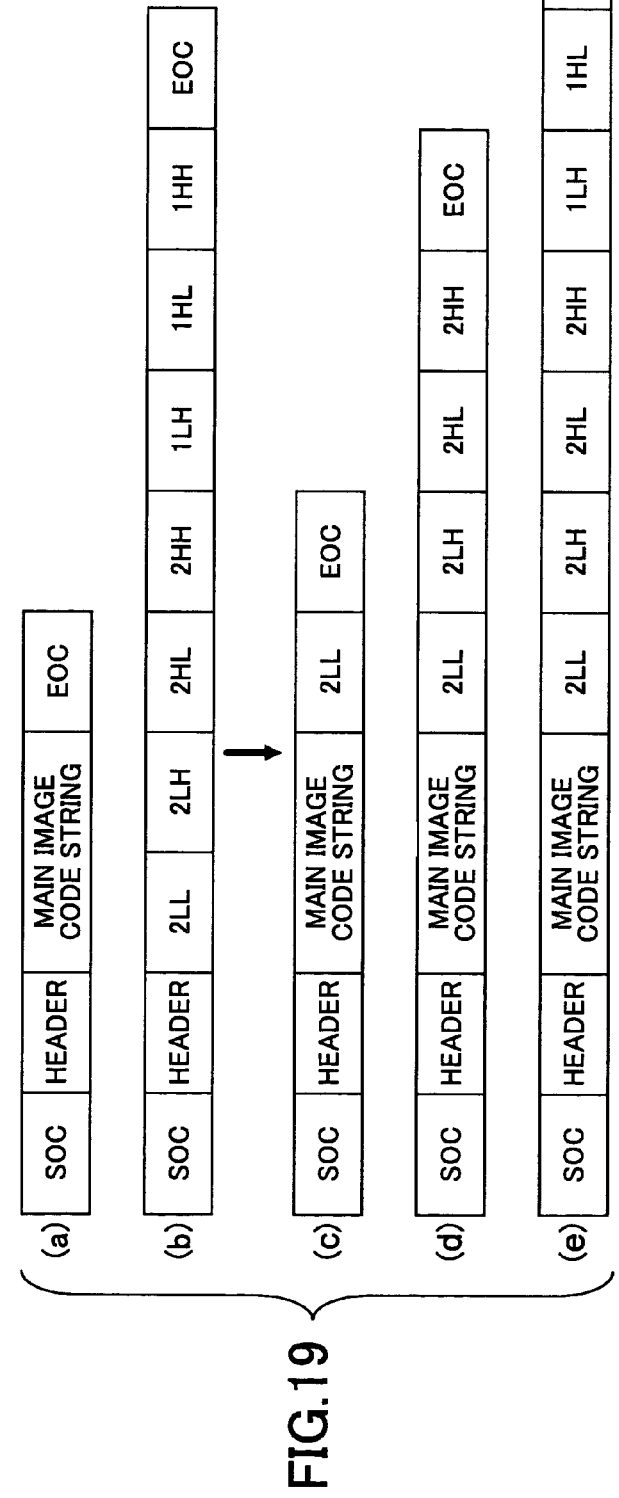
FIG. 19 is yet another diagram for illustrating the superimposing merger operation according to the second embodiment of the present invention.
Figure 20:
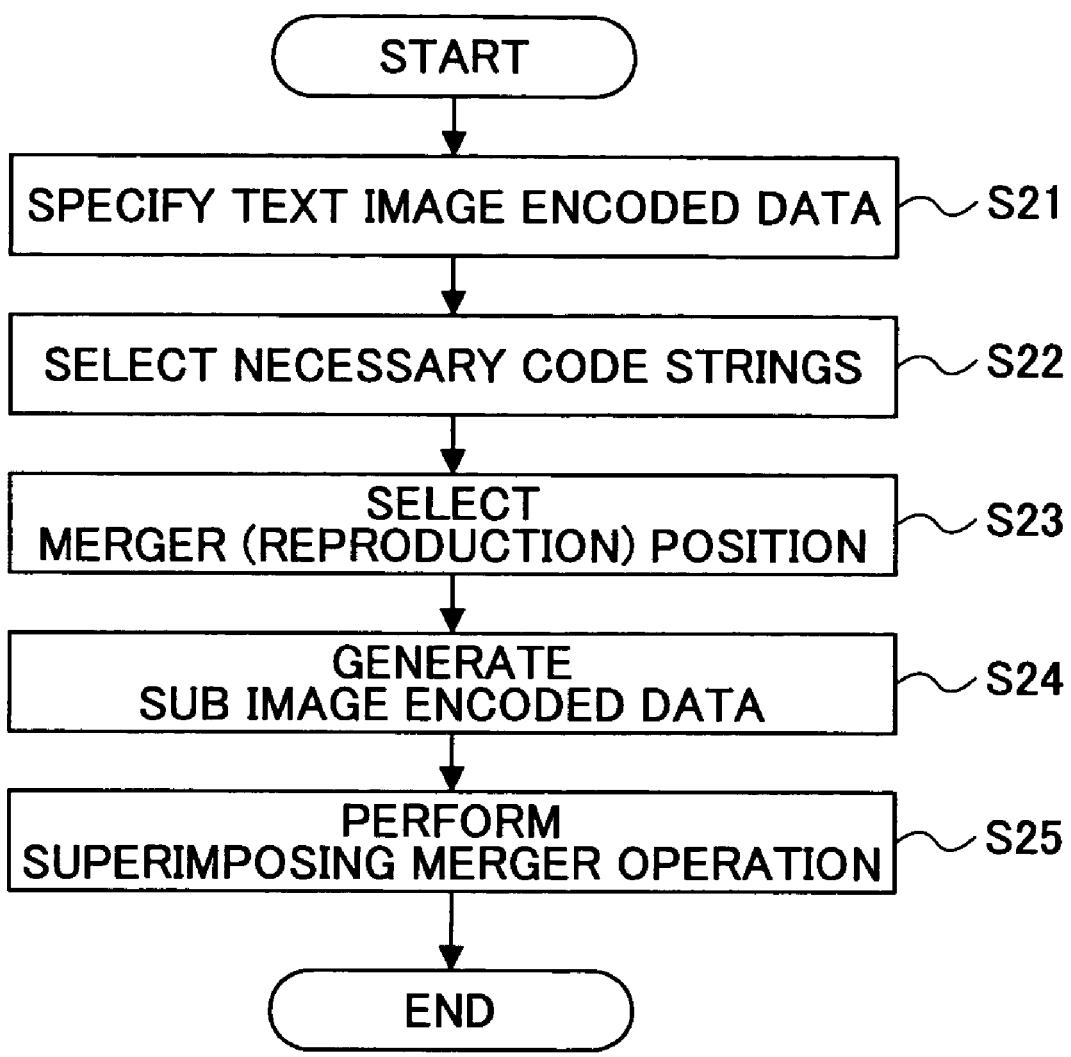
FIG. 20 is a flowchart for illustrating the superimposing merger operation according to the second embodiment of the present invention.
Figure 21:
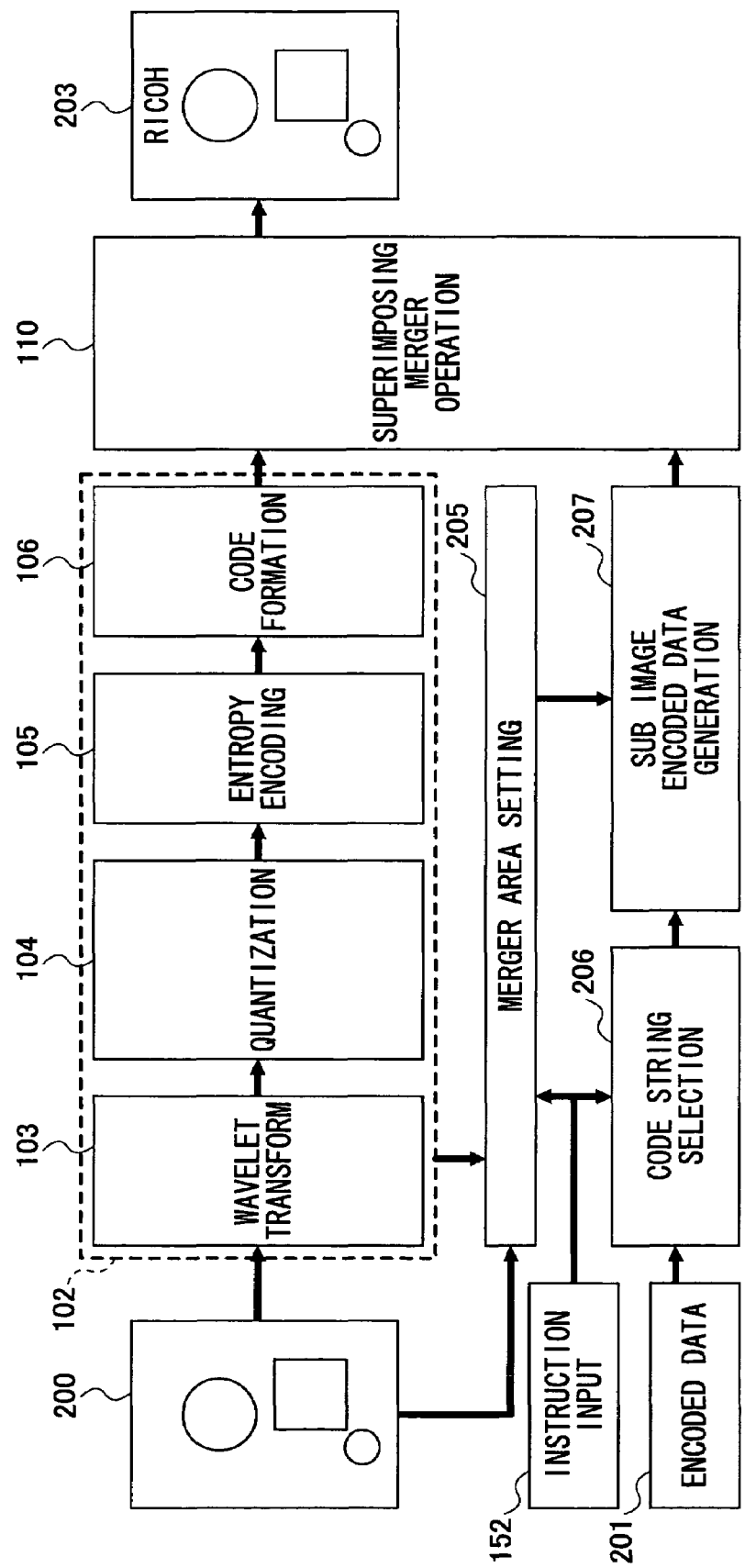
FIG. 21 is a block diagram for illustrating a functional configuration of the image processing system according to the second embodiment of the present invention.

Next, a description is given, with reference to FIGS. 17 through 21, of a second embodiment of the present invention. FIGS. 17 through 19 are diagrams for illustrating the superimposing merger operation according to the second embodiment of the present invention. FIG. 20 is a flowchart for illustrating the superimposing merger operation according to the second embodiment. FIG. 21 is a block diagram for illustrating a functional configuration of the image processing system according to the second embodiment.

First, a description is given, with reference to FIGS. 17 through 19, of the superimposing merger operation according to the second embodiment.

In FIG. 17, (a) shows the encoded data (codestream) of a main image, and (b) shows encoded data in which a code string is divided into multiple units of areas (area units). If the encoded data complies with the JPEG2000 format, tile, precinct, or code block may be selected as an area unit (see the description of JPEG2000 given below).

According to the second embodiment of the present invention, encoded data composed of the code string(s) of one or more area units selected from the encoded data shown in (b) of FIG. 17 may be employed as a sub image and merged superimposedly into the encoded data of the main image (shown in (a) of FIG. 17). For instance, if encoded data composed of the code strings of two of the area units of the encoded data shown in (b) of FIG. 17 is employed as a sub image and merged superimposedly into the encoded data of the main image shown in (a) of FIG. 17, encoded data structured as shown schematically in (c) of FIG. 17 is generated. As described above, a code length written in the header of the encoded data of (c) of FIG. 17 is updated.

A description is given, with reference to FIG. 18, of a specific case of the above-described superimposing merger operation. In FIG. 18, (a) shows the encoded data of a text image composed of a character string "2003 Y (year) 8 M (month) 20 D (day)," and its code string is segmented based on the area units of characters. Sub image encoded data composed of only the code string of a character string "8 M 20 D" of the text image is generated and merged superimposedly into the encoded data of the main image. As a result, superimposedly merged encoded data as shown schematically in (b) of FIG. 18 is generated.

Such an operation of generating sub image encoded data and performing the superimposing merger operation thereon as described with reference to FIG. 18 can be performed in a procedure shown in FIG. 20. First, in step S21, the encoded data of text image is specified. Then, in step S22, the code strings of desired area units (characters) to be merged are selected from the specified text image encoded data. In step S23, the merger (or reproduction) position of the selected code strings is set by user specification or automatically. Then, in step S24, sub image encoded data configured so as to have the selected character code strings merged at the set merger position is generated. Finally, in step S25, the sub image encoded data is merged superimposedly into the encoded data of a main image.

FIG. 19 illustrates another case of the superimposing merger operation according to the second embodiment. In FIG. 19, (a) shows main image encoded data, and (b) shows hierarchically structured (or hierarchized) encoded data in which code strings in the units of sub-bands are arranged in descending order of their hierarchies (for instance, JPEG2000 encoded data may have such a code structure). Sub image encoded data composed of only the code string of the 2LL sub-band of the encoded data of (b), sub image encoded data composed of only the code strings of the 2LL through 2HH sub-bands of the encoded data of (b), and sub image encoded data composed of the code strings of the 2LL through 1HH sub-bands of the encoded data of (b) are generated and individually merged superimposedly into the main image encoded data of (a) so that superimposedly merged encoded data shown in (c), (d), and (e), respectively, of FIG. 19 are generated. When the encoded data of (c) is decoded, the sub image is reproduced at the lowest resolution. When the encoded data of (d) is decoded, the sub image is reproduced at a resolution one level higher than the lowest resolution. When the encoded data of (e) is decoded, the sub image is reproduced at the highest resolution.

In the case of encoded data where a code string is divided into area units as shown in FIG. 17 and the code string of each area unit is divided into the code strings of sub-bands as shown in FIG. 19, sub image encoded data composed of code strings selected based on the units of areas and hierarchies or sub-bands can be generated and merged superimposedly into main image encoded data. For instance, JPEG2000 encoded data has such a data structure.

FIG. 21 is a block diagram for illustrating a functional configuration for generating sub image encoded data as described with reference to FIGS. 17 through 19 and performing the superimposing merger operation thereon. Each element shown in FIG. 21 is provided in the server 1 (FIG. 1) of the image processing system according to the present invention. In FIG. 21, the same elements as those of FIGS. 11 and 15 are referred to by the same numerals, and a description thereof is omitted.

Referring to FIG. 21, a main image 200 is encoded by the first encoding unit 102 so that the encoded data of the main image 200 is generated.

A merger area setting unit 205 sets an area (a merger area) in the main image 200 where a sub image is merged superimposedly. This area may be set in accordance with a user instruction input through the instruction input unit 152 of the client 2. For instance, this user instruction may be a method selecting one or more areas from predetermined multiple areas or a method selecting one or more rectangular areas when the main image 200 is divided into multiple rectangular areas, using the user interface of the client 2.

Further, the merger area setting unit 205 may extract image characteristics (edge components) by analyzing the main image 200 or LL sub-band coefficients generated by the wavelet transform unit 103, and automatically set the merger area based on the extracted image characteristics. For instance, when it is desired to mask a noise portion of the main image 200 with a sub image, an area that is presumed to be the noise portion may be set as the merger area. When it is desired to set the merger area so that a reproduced sub image may not conceal the region of interest (ROI) of the main image 200, an area of the main image 200 presumed to be blank or with little information may be set as the merger area. On the other hand, when it is desired to reproduce a sub image in the ROI (for instance, an area of a particular color such as a skin color, or an area with a large amount of information) of the main image 200, the ROI of the main image 200 may be set as the merger area.

In FIG. 21, encoded data 201 has its code string divided into multiple area units as, for instance, the encoded data of the text image shown in (a) of FIG. 18. A code string selection unit 206 selects one or more code strings from the encoded data 201 based on the units of areas in accordance with a user instruction input from the instruction input unit 152 of the client 2 or the size of the merger area set in the merger area setting unit 205. Further, when the encoded data 201 is hierarchically structured as shown in (b) of FIG. 19, the code string selection unit 206 can select one or more code strings based on the units of hierarchies or sub-bands in accordance with a user instruction or the size of the merger area set in the merger area setting unit 205. Further, when the code string of the encoded data 201 is divided into area units such as shown in FIG. 17, and the code string of each area is hierarchically structured such as shown in FIG. 19, the code string selection unit 206 can select one or more code strings based on the units of areas, and can select the code string of a particular hierarchy or sub-band of each selected code string.

Thus, according to the functional configuration shown in FIG. 21, for instance, a necessary character or pattern of a prepared text image or particular pattern image can be added to a main image and displayed. Further, the necessary character or pattern can be displayed at a required resolution or in a required size. By setting the merger area of the main image as desired, a legend can be displayed in and masking can be performed on any area of the main image. Further, the contents (the number of characters of a legend), size, or resolution of a sub image to be displayed in the set merger area can be adjusted automatically in accordance with the size of the set merger area. Further, an appropriate merger area where a legend or mask pattern is to be displayed can be set automatically based on the characteristics of the main image.

A sub image encoded data generation unit 207 generates sub image encoded data whose contents are the code strings selected by the code string selection unit 206 so that an image corresponding to the code strings is merged superimposedly into the merger area set by the merger area setting unit 205. The sub image encoded data generated by the sub image encoded data generation unit 207 and the main image encoded data generated by the first encoding unit 102 are merged superimposedly by the superimposing merger operation unit 110. Superimposedly merged encoded data 203 is transferred to the client 2. The operations on the client 2 side are equal to those described with reference to FIGS. 11 through 15, and a description thereof is omitted. When the encoded data 203 is decoded, the sub image is reproduced superimposedly in the merger area of the main image 200 set by the merger area setting unit 205.

The above description of the image processing system according to the present invention also covers an image processing method according to the present invention. Further, as described above, the image processing system according to the present invention can be realized by one or more programs using one or more computers. The same holds true for the image processing method according to the present invention. The present invention also includes computer-readable information recording (storage) media, such as magnetic disks, optical disks, magneto-optical disks, and semiconductor storage devices, on which a program causing a computer to execute such a method is recorded.

Thus, according to the present invention, by decoding encoded data into which the encoded data of a main image and the encoded data of a sub image are merged superimposedly, the main image can be displayed with a name, date, legend, or logo being added thereto or a particular portion thereof being masked. Unlike in area replacement, the complete main image is stored in the superimposedly merged encoded data. Accordingly, by performing the separation operation on the superimposedly merged encoded data, it is possible to display only the main image, and it is also possible to display only the sub image. Further, since the sub image is merged into the main image, and does not replace a partial area of the main image, the sub image may have any size and shape, so that the merger (or reproduction) position of the sub image can be set to any position as desired. Further, by performing the position changing operation on the superimposedly merged encoded data, the reproduction position of the sub image can be changed with ease. Further, by performing the merger changing operation, the main image can be displayed with a different legend being added thereto or another portion thereof being masked. For instance, by generating the encoded data of a sub image composed of the code string of a necessary area based on the encoded data of a text image or a particular pattern image that are divided into multiple areas, the main image can be displayed with a necessary character or pattern being added thereto. Further, for instance, by generating the encoded data of a sub image composed of the code string of a necessary hierarchy based on the hierarchized encoded data of a text image or a particular pattern image, a character or pattern to be added to the main image can be displayed at a required resolution or in required size. By setting the merger area of the main image as desired, a legend can be displayed in or masking can be performed on any area of the main image. Further, the contents (the number of characters of a legend), size, or resolution of the sub image to be displayed in the merger area can be adjusted automatically in accordance with the size of the set merger area. Further, an appropriate merger area in which a legend or mask pattern is to be displayed can be automatically set based on a characteristic of the main image.

Figure 22:
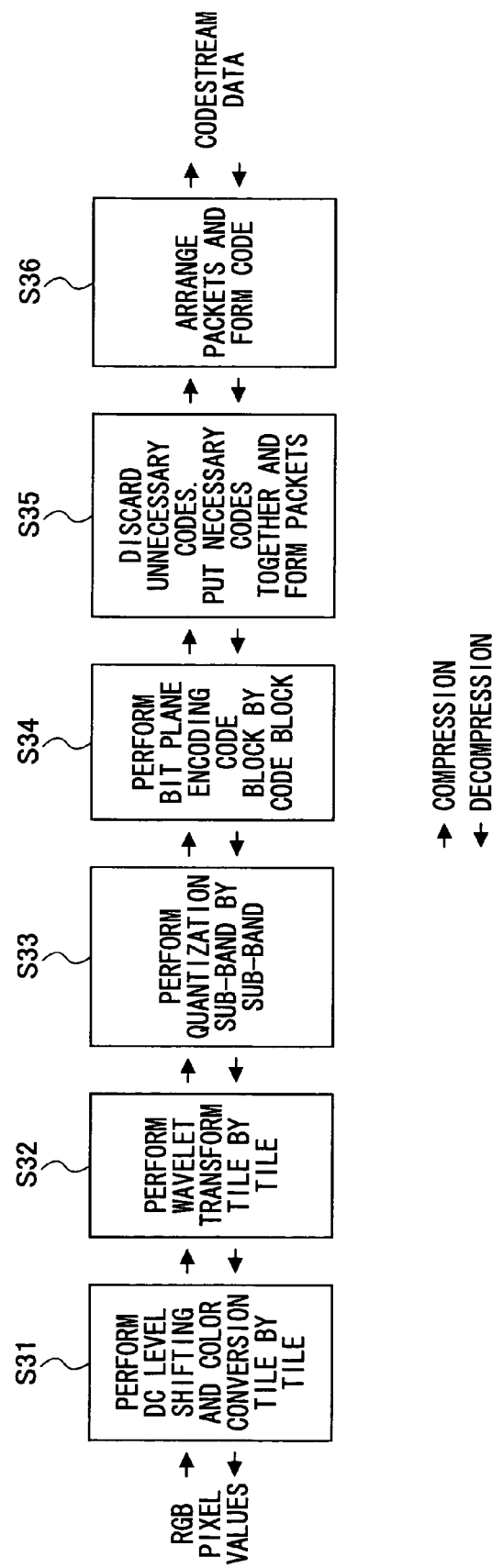
FIG. 22 is a diagram showing a typical operation flow of JPEG2000 coding.

Next, a description is given of the outline of JPEG2000, which is referred to in relation to the embodiments of the present invention. FIG. 22 is a diagram showing a typical operation flow (compression and decompression) of JPEG2000 coding.

For instance, in the case of encoding a color image composed of three components of R (red), G (green), and B (Blue), each component is divided into non-overlapping rectangular areas (tiles), and processing is performed tile by tile in each component. The tile size can be specified by a user, and the tile size may be equalized with the size of the image.

First, in step S31 of FIG. 22, DC level shifting and color conversion to luminance and color difference components are performed on each tile. However, DC level shifting and color conversion may be omitted. Next, in step S32, a wavelet transform (discrete wavelet transform) is performed tile by tile in each component. The number of decomposition levels (the number of times wavelet transform is applied or the number of hierarchies) can be specified by a user.

When a 9×7 wavelet transform is employed, in step S33, linear quantization (normalization) is performed sub-band by sub-band. Thereafter, in step S34, entropy encoding is performed on wavelet coefficients sub-band by sub-band. Normally, in order to improve compression efficiency, the wavelet coefficients are decomposed into bit planes, and entropy encoding based on the units of bit planes (bit plane encoding) is performed. To be precise, each bit plane is divided into three sub bit planes, and is subjected to encoding (sub bit plane encoding).

Then, in step S35, "truncation" is performed so that of the obtained codes, those unnecessary are discarded, while the remaining necessary codes are put together so that packets are generated. Finally, in step S36, the generated packets are arranged in a predetermined order with a necessary tag or tag information being added thereto. As a result, a codestream (encoded data) of a predetermined format is formed.

Figure 23:
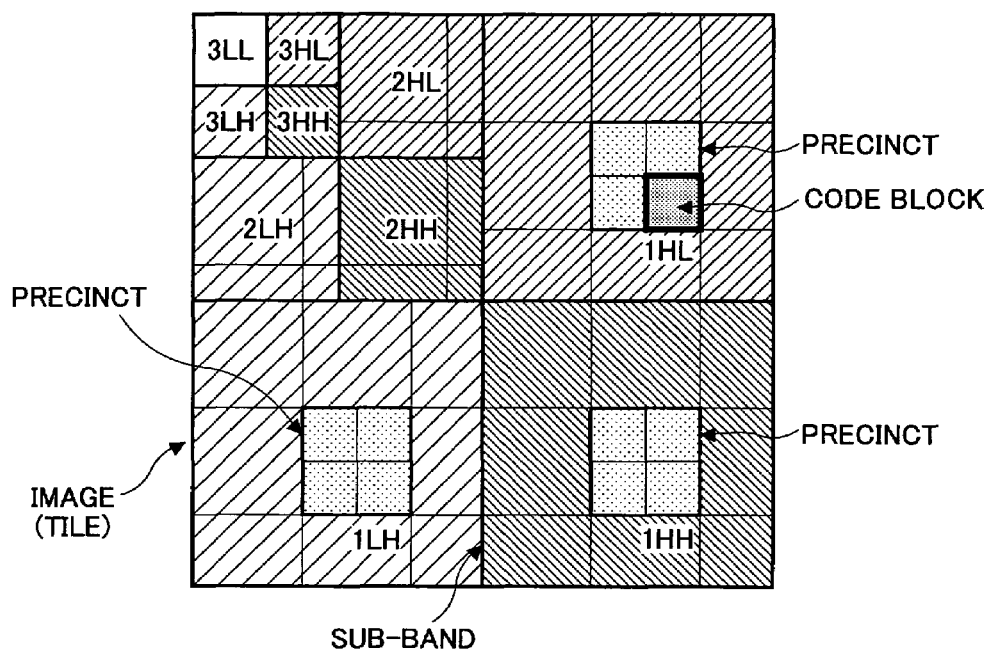
FIG. 23 is a diagram for illustrating the relationship in size among image, tile, sub-band, precinct, and code block according to JPEG2000.

A further description is given of entropy encoding, packet generation, and code formation at the time of encoding. FIG. 23 is a diagram showing the relationship (in size) among image, tile, sub-band, precinct, and code block. In this case, tile size is equal to image size (tile division number=1). Further, the number of decomposition levels of wavelet transform is three, and there are 1LH, 1HL, and 1HH sub-bands of Decomposition Level 1, 2LH, 2HL, and 2HH sub-bands of Decomposition Level 2, and 3LL, 3LH, 3HL, and 3HH sub-bands of Decomposition Level 3.

Precincts, which are rectangular areas (of size specifiable by a user) into which a sub-band is divided, represent approximate positions in an image. With respect to the precincts into which HL, LH, and HH sub-bands are divided, those (three in total) of the corresponding positions are treated as a group. However, with respect to the precincts into which an LL sub-band is divided, each precinct is treated as a group. A precinct may be equal in size to a sub-band. Code blocks are rectangular areas (of size specifiable by a user) into which a precinct is divided. The coefficients of a sub-band are encoded code block by code block. A collection of codes extracted from the codes of all code blocks included in a precinct (for instance, a collection of the codes of the first, or MSB (Most Significant Bit), to third bit planes of all the code blocks) is a packet.

Figure 24:
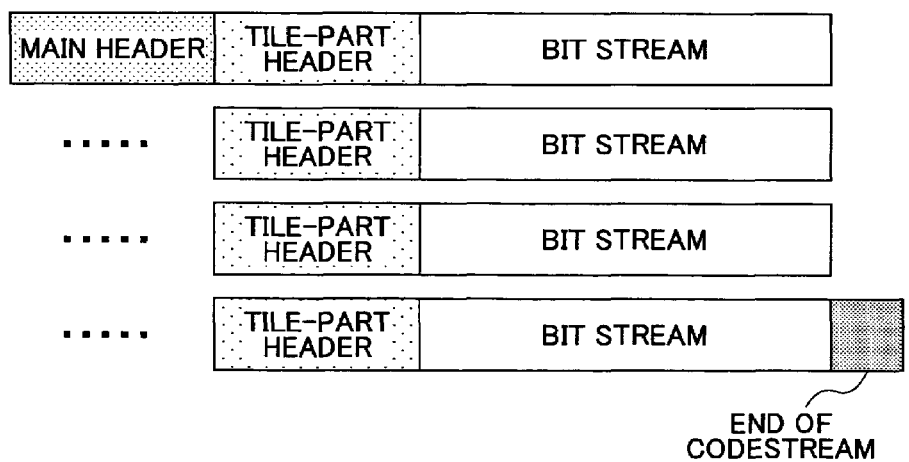
FIG. 24 is a diagram showing a structure of a JPEG2000 codestream.

FIG. 24 is a diagram showing a structure of a JPEG2000 codestream (encoded data). Tag information called Main Header is added to the head of the codestream, and tag information called Tile-Part Header is added to the head of each tile part (bit stream) of the codestream. The code strings or packet strings of tiles, each preceded by corresponding Tile-Part Header, are arranged in a desired progression order. An end tag (End of Codestream) is placed at the end of the codestream.

Decoding is an operation reverse to encoding described with reference to FIG. 22. A codestream is decomposed into the codestreams of the tiles of each component, which are converted to wavelet coefficients by entropy decoding. The wavelet coefficients, if subjected to quantization at the time of encoding, are inversely quantized, and thereafter, are subjected to inverse wavelet transform so as to be converted to pixel values. If DC level shifting and color conversion are performed at the time of encoding, the pixel values obtained after inverse wavelet transform are subjected to inverse color conversion and inverse DC level shifting so as to be converted to the original RGB pixel values.

JPEG2000 has the function of performing various code-level editing operations (a parser function). This parser function makes it possible to easily perform the above-described code-level superimposing merger operation, separation operation, position changing operation, merger changing operation, and the operation of selecting code strings based on the units of areas or hierarchies and generating sub image encoded data. Accordingly, JPEG2000 is one of the coding methods most suitable for the present invention.

Main image and sub image encoded data may be the encoded data of a moving image according to a motion still image method. The encoded data of such a moving image is, for instance, the encoded data of a moving image according to Motion-JPEG2000, which is an extension of JPEG2000. Each of its frames is encoded independently by the JPEG2000 encoding algorithm as a still image, and therefore, can be treated in the same way as the encoded data of a JPEG2000 still image.

The present invention is not limited to the specifically disclosed embodiments, and variations and modifications may be made without departing from the scope of the present invention.

The present application is based on Japanese Priority Patent Application No. 2003-356147, filed on Oct. 16, 2003, the entire contents of which are hereby incorporated by reference.

What is claimed is:

1. An image processing system, comprising:
a superimposing merger operation unit to receive encoded data of a main image and encoded data of at least one sub image and generate superimposedly merged encoded data by merging the encoded data of the main and sub images losslessly via superimposition,
wherein the merged encoded data generated by the superimposing merger operation unit is configured so that the main image is stored therein and that when the merged encoded data is decoded, each of the main image and sub image is reproduced with the sub image being reproduced so that the sub image is superimposed with respect to the main image; and
an encoded data generation unit to generate, from encoded data of an image whose code string is divided into units of areas, encoded data including a code string of a selected one or more of the units of the areas,
wherein the encoded data generated by the encoded data generation unit is input to the superimposing merger operation unit as the encoded data of the sub image.

2. The image processing system as claimed in claim 1, further comprising:
a merger area setting unit to set a merger area of the main image,
wherein:
the encoded data of the sub image includes a code string of at least one of the units of the areas selected in accordance with the merger area set by the merger area setting unit; and
when the merged encoded data is decoded, the sub image is reproduced such that the sub image is superimposed in the set merger area.

3. The image processing system as claimed in claim 2, wherein the merger area setting unit extracts a characteristic of the main image and sets the merger area based on the extracted characteristic.

4. The image processing system as claimed in claim 2, wherein an area of the main image which area is presumed to be a blank area is set as the merger area.

5. The image processing system as claimed in claim 2, wherein an area of the main image which area is presumed to be a region of interest is set as the merger area.

6. The image processing system as claimed in claim 1, further comprising:
an encoded data generation unit to generate, from encoded data of an image having a hierarchized code string, encoded data including a code string of a selected one or more of hierarchies,
wherein the encoded data generated by the encoded data generation unit is input to the superimposing merger operation unit as the encoded data of the sub image.

7. The image processing system as claimed in claim 6, further comprising:

a merger area setting unit to set a merger area of the main image, wherein:

the encoded data of the sub image includes a code string of at least one of the hierarchies selected in accordance with the merger area set by the merger area setting unit; and when the merged encoded data is decoded, the sub image is reproduced such that the sub image is superimposed in the set merger area.

8. The image processing system as claimed in claim 7, wherein the merger area setting unit extracts a characteristic of the main image and sets the merger area based on the extracted characteristic.

9. The image processing system as claimed in claim 7, wherein an area of the main image which area is presumed to be a blank area is set as the merger area.

10. The image processing system as claimed in claim 7, wherein an area of the main image which area is presumed to be a region of interest is set as the merger area.

11. The image processing system as claimed in claim 1, further comprising:

a merger area setting unit to set a merger area of the main image, wherein when the merged encoded data is decoded, the sub image is reproduced such that the sub image is superimposed in the set merger area.

12. The image processing system as claimed in claim 11, wherein the merger area setting unit extracts a characteristic of the main image and sets the merger area based on the extracted characteristic.

13. The image processing system as claimed in claim 11, wherein an area of the main image which area is presumed to be a blank area is set as the merger area.

14. The image processing system as claimed in claim 11, wherein an area of the main image which area is presumed to be a region of interest is set as the merger area.

15. The image processing system as claimed in claim 1, further comprising:

a separation operation unit to separate the merged encoded data generated by the superimposing merger operation unit into the encoded data of the main image and the encoded data of the sub image.

16. The image processing system as claimed in claim 1, further comprising:

a position changing unit to generate, from the merged encoded data generated by the superimposing merger operation unit, different merged encoded data with a different superimposition in which a merger position of the sub image is changed.

17. The image processing system as claimed in claim 1, further comprising:

a merger changing unit to generate, by deleting the encoded data of the sub image from the merged encoded data generated by the superimposing merger operation unit, different merged encoded data with a different superimposition in which encoded data of another sub image is merged via superimposition.

18. The image processing system as claimed in claim 1, further comprising:

a server;

a client; and a client-server interface, wherein:

the merged encoded data is generated in the server and transferred to the client via the client-server interface; and an instruction as to the generation of the merged encoded data is input by a user in the client, and contents of the instruction by the user are transferred to the server via the client-server interface.

19. The image processing system as claimed in claim 18, wherein the client includes one of: a separation operation unit to separate the merged encoded data transferred from the server into the encoded data of the main image and the encoded data of the sub image; a position changing unit to generate different merged encoded data with a different superimposition in which a merger position of the sub image of the merged encoded data transferred from the server is changed; and a merger changing unit to generate, by deleting the merged encoded data of the sub image from the merged encoded data transferred from the server, different merged encoded data with a different superimposition in which encoded data of another sub image transferred from the server is merged via superimposition.

20. An image processing method, comprising:

using a processor to perform operations of:

(a) generating merged encoded data by merging encoded data of a main image and encoded data of at least one sub image losslessly via superimposition, wherein the merged encoded data is configured so that the main image is stored therein and that when the merged encoded data is decoded, each of the main image and sub image is reproduced with the sub image being reproduced via superimposition with respect to the main image;

(b) generating, from encoded data of an image whose code string is divided into units of areas, encoded data including a code string of a selected one or more of the units of the areas, wherein the encoded data generated by said step (b) is processed as the encoded data of the sub image.

21. The image processing method as claimed in claim 20, further comprising:

(c) setting a merger area of the main image, wherein the encoded data of the sub image is generated so as to include a code string of at least one of the units of the areas selected in accordance with the merger area set.

22. The image processing method as claimed in claim 20, further comprising:

(b) generating, from encoded data of an image having a hierarchized code string, encoded data including a code string of a selected one or more of hierarchies, wherein the encoded data generated from the encoded data of the image whose code string is divided into units of areas is processed as the encoded data of the sub image.

23. The image processing method as claimed in claim 22, further comprising:

(c) setting a merger area of the main image, wherein the encoded data of the sub image is generated so as to include a code string of at least one of the hierarchies selected in accordance with the merger area set.

24. A computer-readable recording medium on which a program for causing a computer to execute an image processing method is recorded, the image processing method comprising:

(a) generating merged encoded data by merging encoded data of a main image and encoded data of at least one sub image losslessly via superimposition, wherein the merged encoded data is configured so that the main image is stored therein and that when the merged encoded data is decoded, each of the main image and sub image is reproduced with the sub image being reproduced such that the sub image is superimposed with respect to the main image; and (b) generating, from encoded data of an image whose code string is divided into units of areas, encoded data including a code string of a selected one or more of the units of the areas, wherein the encoded data generated from the encoded data of the image whose code string is divided into units of areas by said step (b) is processed as the encoded data of the sub image.

* * * * *